(12) United States Patent
Jousse et al.

(10) Patent No.: US 7,182,887 B2
(45) Date of Patent: *Feb. 27, 2007

(54) CONDUCTIVE COMPOSITE MATERIAL AND FUEL CELL ELECTRODE USING SAME

(75) Inventors: Franck Jousse, Ambaise (FR); Jean-Felix Salas, Montbazon (FR); Didier Marsacq, Grenoble (FR); Philippe Mazabraud, Martin (FR)

(73) Assignee: Commissariat a l'Energie Atomique, Paris (FR)

( * ) Notice: Subject to any disclaimer, the term of this patent is extended or adjusted under 35 U.S.C. 154(b) by 327 days.

This patent is subject to a terminal disclaimer.

(21) Appl. No.: 10/333,940

(22) PCT Filed: Jul. 23, 2001

(86) PCT No.: PCT/FR01/02393

§ 371 (c)(1),
(2), (4) Date: Jan. 23, 2003

(87) PCT Pub. No.: WO02/09220

PCT Pub. Date: Jan. 31, 2002

(65) Prior Publication Data

US 2004/0028993 A1 Feb. 12, 2004

(30) Foreign Application Priority Data

Jul. 24, 2000 (FR) .................................. 00 09667

(51) Int. Cl.
*H01B 1/24* (2006.01)
*H01M 4/62* (2006.01)
(52) U.S. Cl. ........................ 252/511; 264/105; 429/42; 429/44; 429/232

(58) Field of Classification Search ................ 252/511; 264/105; 429/42, 44, 232
See application file for complete search history.

(56) References Cited

U.S. PATENT DOCUMENTS 3,404,061 A  10/1968  Bochman et al. ........... 428/143
4,366,205 A  12/1982  Tsukagoshi et al. ........ 428/338

(Continued)

FOREIGN PATENT DOCUMENTS

EP  0 268 397  10/1987

(Continued)

OTHER PUBLICATIONS

Search Report PCT/FR 01/02392 (Jan. 16, 2002).

(Continued)

*Primary Examiner*—Mark Kopec
(74) *Attorney, Agent, or Firm*—Thelen Reid Brown Raysman & Steiner LLP

(57) ABSTRACT

A conducting composite material is composed of a kneaded and compressed mix. The mix includes (a) from 40 to 90% by volume of a flake graphite powder comprising a flake graphite type formed from graphite particle agglomerates bonded to each other and superposed such that their principal planes are parallel to each other, these agglomerates having a planar anisotropy with side dimensions between 10 $\mu$m and 1 mm and between 5 and 50 $\mu$m thick, (b) from 0 to 25% by volume of conducting fibres, and (c) from 10 to 40% by volume of an organic binder. This material can be used for making electrodes for fuel cells.

44 Claims, 1 Drawing Sheet

U.S. PATENT DOCUMENTS

| | | | | |
|---|---|---|---|---|
| 4,414,142 A | 11/1983 | Vogel et al. | ................ | 252/506 |
| 4,680,139 A | 7/1987 | Williams et al. | ............ | 252/511 |
| 4,704,231 A | 11/1987 | Chung | ........................ | 252/511 |
| 4,988,583 A | 1/1991 | Watkins et al. | ................ | 429/30 |
| 5,286,415 A | 2/1994 | Buckley et al. | ............. | 252/502 |
| 5,804,116 A | 9/1998 | Schmid et al. | ............... | 264/104 |
| 6,106,263 A | 8/2000 | Schmid et al. | ............... | 425/144 |
| 6,413,671 B1 | 7/2002 | Mercuri et al. | .......... | 429/231.8 |
| 6,803,150 B1 * | 10/2004 | Iriyama et al. | .......... | 429/231.8 |

FOREIGN PATENT DOCUMENTS

| | | | |
|---|---|---|---|
| EP | 0268397 | | 5/1988 |
| EP | 0 415 733 | | 8/1990 |
| EP | 0415733 | | 3/1991 |
| EP | 0 784 352 | | 4/1996 |
| EP | 0 774 337 | | 5/1996 |
| EP | 0 805 463 | | 2/1997 |
| EP | 0774337 | | 5/1997 |
| EP | 0784352 | | 7/1997 |
| EP | 0805463 | | 11/1997 |
| EP | 0 935 303 | | 7/1998 |
| EP | 0935303 | | 8/1999 |
| EP | 1 011 164 | | 12/1999 |
| EP | 1011164 | | 6/2000 |
| EP | 1 059 348 | | 9/2000 |
| EP | 1059348 | | 12/2000 |
| GB | 928351 | | 6/1963 |
| JP | 11-354136 | | 12/1999 |
| JP | 2000-077081 | | 3/2000 |
| WO | WO00/13245 | * | 3/2000 |
| WO | WO 00/25372 | | 5/2000 |
| WO | WO 00/30202 | | 5/2000 |

OTHER PUBLICATIONS

Search Report PCT/FR 01/02393 (Jan. 21, 2002).

Cover page of EP Office Action of Apr. 5, 2006 citing JP2000-077081 and JP 11-354136.

* cited by examiner

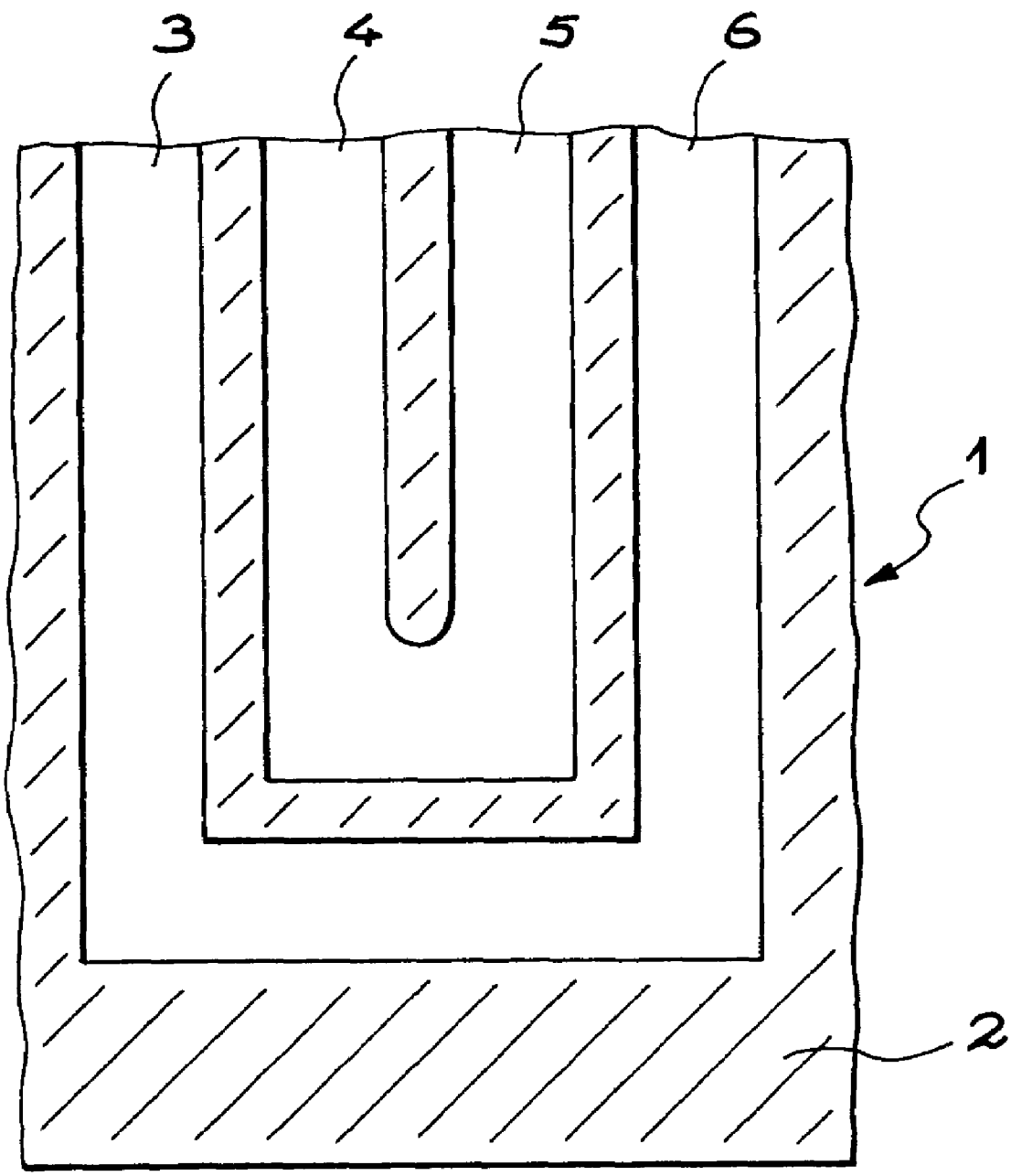

CONDUCTIVE COMPOSITE MATERIAL AND FUEL CELL ELECTRODE USING SAME

CROSS-REFERENCE TO RELATED APPLICATION

This application is based on International Patent Application No. PCT/FR01/02393, entitled "Conducting Composite Material And Electrode For Fuel Cell Using This Conducting Composite Material" by Franck Jousse, Jean-Felix Salas, Didier Marsacq and Philippe Mazabraud, which claims priority of French application no. 00/09667, filed on Jul. 24, 2000, and which was not published in English. This application is related to U.S. patent application Ser. No. 10/333,809, entitled Composite Conducting Material And Electrode For A Fuel Cell Using Said Material Formed By Thermo-Compression," by Pierre Baurens, Eric Bourgeoisat, Franck Jousse and Jean-Felix Salas, which was filed on the same date and assigned to the same assignee, which is based on International Patent Application No. PCT/FR01/02392 which claims priority of French application no. 00/09666, filed on Jul. 24, 2000, and which was not published in English.

TECHNICAL FIELD

The present invention relates to a conducting composite material and its manufacturing process. It also relates to an electrode for a fuel cell and a manufacturing process for such an electrode.

STATE OF PRIOR ART

Electrically conducting composite materials are composed of conducting particles dispersed in an organic matrix. The electrical conduction threshold, or the percolation threshold (transition from the insulating state to the conducting state) is achieved when the conducting particles form a network of connected conducting paths throughout the volume of the composite material.

The conducting particles may be metallic, which has the advantage of good electrical conductivity. However, they have the disadvantage of having a high density and that they are sensitive to the chemical environment of the cell. Non-metallic conducting particles are particularly attractive due to their low density and their chemical resistance. The most frequently used non-metallic conducting charges are carbon based powder products such as carbon black or graphite powders and carbon fibres.

Depending on the morphology of the particles (shape ratio, specific area), the percolation threshold is reached for filler contents of a few percent by volume for fibres and 20 to 30% by volume for spheres. Typically, these fillers can result in conductivities within the volume of the material of the order of $10^{-5}$ to $10^{-1}$ S/cm. It is also observed that the conductivity of composite materials is much lower than the conductivity of the fillers used (of the order of 1000 S/cm for graphite) although the filler contents are greater than the percolation threshold. This effect is explained by the large contact resistance between adjacent particles. These resistances are related firstly to the low contact area between two particles (constriction resistance) and secondly to the formation of an insulating film at the surface of the charges during their dispersion in the organic binder (tunnel resistance).

The constriction resistance is defined by the relation $R_{cr}=\rho_f/d$ where $\rho_f$ represents the resistivity of the filler and d represents the diameter of the contact surface area between the grains. The filler overlap area is controlled by the filler geometry and their viscoelastic properties, in other words their deformability under stress.

Tunnel resistance is associated with any insulating film that can cover the surface of the particles. It may consist of adsorbed surfactants or more simply the organic matrix that surrounds the fillers, after the fillers have been dispersed. In this configuration, the conduction mechanism between conducting grains is no longer a pure resistance, but takes place in electronic skips between isolated particles. Due to the poor electronic transport properties of polymers, the local electrical field between conducting grains necessary to achieve circulation of an electric current through all clusters of conductors formed by the fillers must be very large. In practice, the local electrical field is never large enough to enable an electronic skip between every connected particle but isolated by a polymer film. Only a small proportion of the conducting paths is affected and genuinely participates in circulation of the current. The macroscopic conductivity is very much reduced. The tunnel resistance is defined by the relation $R_t=\rho_t/a$ where $\rho_t$ represents the tunnel resistivity related to the thickness of the film and the electrical properties of the insulating organic matrix, and in which a quantifies the contact area.

The resistance at the interface between two particles is the sum of the constriction and tunnel resistances. In the vast majority of cases, the tunnel resistance governs the macroscopic conductivity of heterogeneous media. The tunnel resistance increases from $10^{-8}$ to $10^3$ Ω·cm when the thickness of the insulating film covering the conducting particles in contact varies from 0.5 to 12 nm. This insulation thickness equal to a few nanometers conventionally corresponds to the polymer matrix layer adsorbed on the surface of the fillers during dispersion.

Polymer membrane fuel cells now developed make use of bipolar type separating plates. In a complete assembly composed of a sequence of electrochemical cells, the functions of these bipolar plates are to separate the anode and cathode electrodes, enable distribution of hydrogen and oxygen gases to the cathode and the anode respectively, collect the generated electrical current, and in some cases enable cooling of the cell.

The materials from which these dipole separating plates are made must satisfy the following criteria:
high conductivities per unit surface area and per unit volume, equal to at least 10 S/cm,
impermeability to hydrogen and oxygen gases,
high mechanical strength,
chemical resistance in the acid environment of the electrochemical cell, possible degradation of dipole plate materials not causing any pollution of the electrochemical cell.

These materials must be shaped to form plates at the surface of which gas distribution ducts are made. Installation techniques and costs of dipole plates must remain compatible with automobile manufacturing constraints.

At the present time, bipolar plates are made from non-corrodable machined graphite boards or stamped metal boards (stainless steel or aluminium coated with titanium). Solutions using machined graphite are expensive and it is difficult to see how they are compatible with large production series. Solutions using metallic particles give relatively heavy boards.

One method of improvement is to make bipolar separating plates directly by casting conducting composites.

The general principles described above suggest that making highly conducting composite materials requires the use of materials with a very high content of conducting elements, using conventional polymer transformation techniques, in order firstly to increase the number of contacts between conducting particles, and secondly to increase contact areas between adjacent elements.

These principles were repeated for the development of lightweight elements for fuel cells and in particular were followed by the deposition of patent applications EP-A-0 774 337, WO-A-96/12309, EP-A-0 933 825 and WO-A-98/53514.

Application EP-A-0 774 337 describes a process for manufacturing of moulded bodies by extrusion of plastic material with a content of more than 50% by volume (preferably between 65 and 90%) of conducting elements (flake or no-flake graphite, conducting fibres, etc.). Initially, the constituents are kneaded in a kneader, and then after being ground and crushed, the mix is extruded in the form of a board or tube. The composite materials obtained are made using any commercially available type of conducting filler.

Document WO-A-96/12309 describes the manufacture of a stack for a fuel cell using a conducting composite material obtained by a thermocompressed mix of the flake graphite and fluorinated resin (PTFE). The composite material obtained using this process is not porous and can be compression moulded directly. The structure of the conducting composite material and the nature of the fillers are not optimised to control impermeability to gases and cooling of the cell. A barrier material has to be deposited on the surface to seal the assembly.

Document EP-A-0 933 825 discloses a process for the manufacture of separation boards for fuel cells based on a thermo-setting binder (phenolic resin and epoxy) possibly but not necessarily containing a flake graphite. The mix is thermocompressed in a mould with the geometry of the separating boards to be made. The porosity, and therefore as a first approximation the impermeability to gases, is optimised by facilitating evacuation of water and gases formed during cross linking. However, an insulating resin layer covers the surface of the boards and must be eliminated by stripping.

Document WO-A-98/53514 discloses a manufacturing process by thermocompression of dipole separating boards containing 50 to 95% of conducting fillers in different thermoplastics. The conducting fillers may be graphite, carbon black and carbon fibres. The problem of the impermeability to gases is circumvented by the addition of a hydrophilic agent encouraging the migration of water into the pores of the material. The main advantage of this configuration is that it facilitates evacuation of water produced in the cell and enables cooling of the cell.

SUMMARY OF THE INVENTION

This invention was designed to overcome the disadvantages mentioned below in conducting composite materials. It can be used to:

manufacture conducting parts made from complex shapes of composite materials (for example bipolar plates comprising gas supply ducts) without a machining step;

obtain high conductivities, particularly at the surface;

obtain very low permeabilities to hydrogen gas and oxygen gas, less than the permeability of graphite plates obtained by pyrolysis and then machining;

obtain sufficient mechanical properties to enable installation and operation of fuel cells;

obtain a lightweight conducting material.

To obtain these results, the conducting composite materials according to the invention are made from specific graphite powders that are highly anisotropic and impermeable to hydrogen and oxygen gases, thus enabling electrical and thermal conductivities parallel to the surface of products made from these materials. This surface thus achieves impermeability to gases. These composite materials contain conducting fibres to optimise mechanical properties and volume conductivity. The formulation of these materials is adapted to fast implementation using a mixing-compression technique. Bipolar plates can be made for fuel cells in a few minutes.

A first purpose of the invention consists of a conducting composite material composed of a kneaded and compressed mix, the mix comprising a flake graphite powder, conducting fibres and an organic binder, characterized in that the mix comprises:

from 40 to 90% by volume of a flake graphite powder comprising a flake graphite type formed from graphite particle agglomerates bonded to each other and superposed such that their principal planes are parallel to each other, these agglomerates having a planar anisotropy with side dimensions between 10 μm and 1 mm and between 5 and 50 μm thick, from 0 to 25% by volume of conducting fibres, from 10 to 40% by volume of an organic binder.

Preferably, the flake graphite type agglomerates are composed of particles with a side dimension of 5 to 20 μm and between 0.1 and 5 μm thick.

The flake graphite powder may also comprise another type of flake graphite formed from lamellas with a size grading of between 10 and 100 μm. Preferably, the other type of flake graphite is composed of lamellas with a size grading of between 20 μm and 50 μm.

Also preferably, the conducting fibres are chosen from among carbon fibres, stainless steel fibres and nickel plated carbon fibres. They may be between 1 and 4 mm long.

The organic binder may be a thermoplastic material, preferably a fluorinated type like PVDF.

Advantageously, the mix comprises 70 to 85% by volume of graphite powder, from 0 to 10% of conducting fibres and from 10 to 25% of PVDF.

A second purpose of the invention relates to a manufacturing process for a conducting composite material, characterized in that it comprises:

obtaining a mix comprising 10 to 40% by volume of an organic binder in the form of a powder or pellets, from 40 to 90% by volume of a flake graphite powder comprising a type of flake graphite composed of agglomerates of graphite particles bonded to each other and superposed such that their principal planes are parallel to each other, these agglomerates having a planar anisotropy and with side dimensions between 10 μm and 1 mm and between 5 and 50 μm thick, and up to 25% by volume of conducting fibres with a length of between 0.5 and 10 mm, mixing or extrusion of the mix obtained at a temperature greater than the melting temperature of the organic binder so that a paste can be obtained from said mix, transferring the paste into a mould at a temperature lower than the melting temperature of the organic binder, compression of the paste contained in the mould to obtain said conducting composite material.

If the mix is extruded, the temperature in the feed area must be optimised to prevent any risk of clogging.

Preferably, the paste will be transferred into the mould by extrusion.

The paste contained in the mould may be compressed by a method chosen from among uniaxial compression, extrusion/transfer, extrusion/compression, injection and injection/compression. Extrusion/transfer is a uniaxial compression type moulding method, the material being transferred into the mould by extrusion. The mould may be cold or at a temperature above the melting temperature of the organic binder depending on the production rate and the required properties. Extrusion/compression consists of mixing the powders in an extruder and transferring the molten material into the mould, once again by extrusion. The mould is closed and the material is compressed at 1 to 4 tonnes/cm$^2$ as for uniaxial pressing. Injection/compression consists of injecting the molten material into a semi-open mould after the mix has been extruded. The mould is then closed, which compresses the material. This technique is preferable to conventional injection since the mould is not initially closed, and consequently the pressure necessary for injection is lower, particularly for mixes with very large filler contents.

The flake graphite type may be obtained by grinding graphite sheets in the solid phase or in the solvent phase, a said sheet of graphite being composed of graphite particles in which the principal planes are parallel to the plane of said sheet, followed by sieving. This grinding of graphite sheets may consist of grinding graphite sheets made by calendering and/or rolling of the natural or expanded graphite.

The flake graphite type may also be obtained by grinding a mass of graphite obtained by compression, in the solid or liquid phase, grinding being followed by sieving.

The flake graphite type may also be obtained using the following steps:
  dispersion of exfoliated graphite platelets, or platelets obtained by grinding a graphite sheet in an organic solvent until a homogenous paste is obtained,
  drying the homogenous paste obtained,
  crushing the dried paste to obtain agglomerates of graphite particles,
  sieving of agglomerates of graphite particles.

The drying step may be carried out by filtering the solvent followed by degassing in a vacuum chamber.

The flake graphite powder may also comprise another type of flake graphite formed from lamellas with a size grading of between 10 and 100 µm.

Kneading may be done in an extruder or in a Bambury type kneader with internal mixing.

Preferably, the mix is kneaded or extruded at a temperature between the melting temperature of the organic binder and a temperature of 100° C. above said melting temperature.

If a mix of conducting powders (graphite, fibres) and thermoplastic is extruded, the temperature profile of the screw and the duct is optimised to prevent the thermoplastic powder from getting clogged at the inlet to the extruder feed area.

Preferably, the paste will be transferred in a mould at a temperature of between 20° C. and 70° C. This transfer preferably takes place by extrusion.

The paste may be compressed at a pressure of 0.5 to 5 tonnes/cm$^2$. The compression duration may be between 1 minute and 10 minutes. This type of moulding is similar to extrusion/transfer.

A third purpose of the invention is an electrode for a fuel cell, comprising means of enabling circulation of a gas fluid at the surface of at least one of its main faces, characterized in that it is a conducting composite material composed of a kneaded and compressed mix, the mix comprising:
  from 40 to 90% by volume of a graphite powder comprising a first type of flake graphite type formed from lamellas with a size grading of between 10 and 100 µm and/or a second type of flake graphite formed from graphite particle agglomerates bonded to each other and superposed such that their principal planes are parallel to each other, these agglomerates having a planar anisotropy with side dimensions between 10 µm and 1 mm and between 5 and 50 µm thick,
  from 0 to 25% by volume of conducting fibres,
  from 10 to 40% by volume of an organic binder,
  the lamellas and/or agglomerates having their principal planes parallel to each other and parallel to the main faces of the electrode.

A fourth purpose of the invention relates to a process for manufacturing an electrode for a fuel cell comprising means of circulating a gas fluid at the surface of at least one of its main faces, characterized in that it comprises:
  obtaining a mix comprising 10 to 40% by volume of an organic binder in the form of a powder or pellets, from 40 to 90% by volume of a first type of flake graphite type formed from lamellas with a size grading of between 10 and 100 µm and/or a second type of flake graphite composed of agglomerates of graphite particles bonded to each other and superposed such that their principal planes are parallel to each other, these agglomerates having a planar anisotropy and with side dimensions between 10 µm and 1 mm and between 5 and 50 µm thick, and up to 25% by volume of conducting fibres with a length of between 0.5 and 10 mm,
  kneading or extrusion of the mix obtained at a temperature greater than the melting temperature of the organic binder so that a paste can be obtained from said mix,
  transferring the paste into a mould designed to reproduce said means to enable circulation of a gas fluid, the temperature of the mould being below the melting temperature of the organic binder,
  compression of the paste contained in the mould to obtain said electrode.

The paste contained in the mould may be compressed using a method chosen from uniaxial compression, extrusion/transfer, extrusion/compression, injection and injection/compression.

BRIEF DESCRIPTION OF THE DRAWINGS

The invention will be better understood and other advantages and specificities will become clear after reading the following description given as a non-restrictive example, accompanied by the attached FIGURE that represents a partial view of one of the main faces of an electrode for a fuel cell according to this invention.

DETAILED DESCRIPTION OF AN EMBODIMENT OF THE INVENTION

The remainder of the description will apply to the production of an electrode for a fuel cell from a mix containing a first type of flake graphite and a second type of flake graphite.

The first type of flake graphite has a size grading of between 10 and 100 µm. Preferably, the average size grading is 23 µm. Its specific surface area is between 6 and 25 m²/g and its conductivity is of the order of 1000 S/cm. This type of graphite is commercially available.

The second type of graphite may be composed of particles originating from graphite sheets made previously by calendering expanded graphite. The density of the sheets is 1.1. The permeability of these sheets to helium is $10^5$ cm²/s/atm. The graphite sheets are ground in a solvent to obtain agglomerates of graphite lamellas, the side dimensions of these agglomerates being between 10 µm and 1 mm, the side dimensions of most of these agglomerates being between 100 and 300 µm, and the thickness is between 5 and 50 µm.

The second type of graphite may also be obtained from exfoliated graphite platelets dispersed in an organic solvent. The graphite content in the solvent is between 10 and 50% by volume depending on the dimensional characteristics of the graphite (low dilution rate for graphites with a large specific surface area, and high dilution rate for plates with specific surface area equal to a few m²/g), in order to obtain a low viscosity paste. This mix is stirred until a homogenous dispersion is obtained. The paste is then dried by filtering the solvent and then degassing in a vacuum chamber. Advantageously, the solvent can be recovered during these operations. The dry paste obtained is composed of large agglomerates of graphite platelets, most of the platelets being superposed. In an agglomerate, the platelets are superposed, placed adjacent to each other and most of their principal planes are parallel. This paste is then crushed and sieved in order to obtain graphite agglomerates with a size grading of between 100 µm and 1 mm.

The second type of graphite may also be obtained by grinding solid graphitic materials. Grinding is done in the solid or liquid phase. The powder obtained is sieved to the size grading specified for the second type of graphite. It is preferable to use graphite masses made by compression as a raw material, in order to obtain an anisotropic initial structure.

It may be necessary to incorporate conducting fibres into the electrode material, in order to significantly increase the mechanical properties and the volume conductivity. These conducting fibres may be carbon fibres, stainless steel fibres or nickel plated carbon fibres. The length of the conducting fibres may be between 0.5 and 10 mm. Fibres between 1 and 4 mm long will preferably be used. Thus, the conductivity performances of materials with conducting fibre fillers and of materials with graphite powder fillers can be combined.

Sufficient volume conductivity values can be achieved using composite materials containing conducting fibres only, but the surface resistance remains high. The surface resistance can be increased by the formation of an insulating layer of polymer at the surface of the material, induced by the low content of fibres that can be incorporated into the composite material. On the other hand, materials with a high content of flake graphite obtained by thermo-compression have very low surface resistances but a limited volume conductivity. In this case the conductivity is very anisotropic, possibly even too anisotropic. According to the invention, the mix of conducting fibres and flake graphite can optimise conductivities. However, fibre free mixes may be attractive to reduce costs.

Most organic binders used to make the composite material cohesive are of the thermoplastic type. Fluorinated type thermoplastics, for example PVDF (Polyvinylidene fluoride) are preferred, in order to satisfy environmental constraints in a PEMFC (Polymer Electrolyte Membrane Fuel Cell) or a DMFC (Direct Methanol Fuel Cell) type fuel cell. However, depending on the required mechanical properties and the chemical resistance and the accepted cost, any type of thermoplastic or thermosetting material can be used in the form of pellets, powder or a viscous liquid for which the viscosity in the "softened" state when hot and the lives (for thermosetting materials) are such that the "kneading/compression" technique can be used.

The preferred ranges of contents are as follows, to optimise conductivity performances while guaranteeing acceptable handling:
  from 40 to 90% by volume of graphite powder. This powder is composed of a mix of powder G1 (first type of graphite) and powder G2 (second type of graphite). The ratio G2/G1 is higher when it is required to improve the impermeability to hydrogen gas and oxygen gas,
  up to 25% by volume of conducting fibres. The fibre content is higher when it is required to achieve high values of the volume conductivity. This content is limited by the cost of fibres and the difficulty of incorporating more than 30% of fibres by volume,
  from 10 to 40% by volume of thermoplastic resin.

Preferably, formulations by volume may be within 70 to 85% of graphite, 0 to 10% of fibres and 10 to 25% of PVDF.

Kneading may be done in a two-screw or single-screw extruder, or in a Bambury type kneader with internal mixing. The use of an extruder is better adapted for continuous production. The temperature of the kneader is between the melting temperature of the selected binder and a temperature exceeding this melting temperature by 100° C. This firstly lowers the viscosity of the molten polymer and thus facilitates the addition of fillers, and secondly it keeps the temperature of the mix above the melting temperature to initiate the second phase in the process, in other words compression. In the case of a mix by extrusion, the temperatures along the screw are optimised to prevent the feed area getting clogged by molten thermoplastic powder. At the end of the kneading phase, the mix is a paste in which the polymer binder is in the molten state, requiring a compression phase firstly so that it can be moulded in the form of a bipolar plate for example, and secondly to confer the required electrical and thermal anisotropic conductivities.

The mix with its fillers, still in the molten state, is transferred from the kneader to a cold mould so that it can be axially compressed in the mould. It is advantageous to make the transfer of the molten material to the mould by extrusion. This reduces heat losses during the transfer. This operation may advantageously be coupled to the previous kneading by extrusion operation. This is then referred to as extrusion/transfer. The mould is composed of a base and a piston at the surface of which the gas supply ducts are machined by forming recesses. The temperature of the mould is between 20° C. and the melting temperature of the polymer. Mould removal is faster and easier when the temperature is lower, and this can accelerate the production rate. However, a hot mould tends to lower the surface resistance. In the case of an electrode for a fuel cell, it is preferable if the mould temperature is between 20° C. and 70° C., in other words significantly lower than the melting temperature of the polymer.

The mix is compressed at a pressure of between 0.5 and 5 tonnes/cm² for a duration of between 1 and 10 minutes, depending on the required mechanical and porosity properties.

This compression moulding step may advantageously be carried out either by conventional injection (difficult operation due to the viscosity of the molten material), or preferably by injection/compression in a semi-open mould. In this case, the material is injected into the open mould for which the required pressure is less than for a closed mould, and the mould is then closed by the press.

The attached FIGURE shows a partial view of one of the main faces of an electrode for a fuel cell according to this invention. The main face 2 of the electrode (or the bipolar plate) 1 comprises interconnected grooves 3, 4, 5 and 6 to enable circulation of a gas fluid on face 2 of the electrode.

The materials according to the invention based on G1 graphite (first type of flake graphite), G2 graphite (second type of flake graphite) and conducting fibres obtained by the fast "kneading-compression" technique differ from state of the art materials by a very high anisotropic stratified structure. This structure has the following advantages.

In the case of a bipolar plate, the conductivity parallel to the main faces of the plate is very much higher than the conductivity perpendicular to the plate. This property is a consequence of the stratified structure of the material in the plate. For example, for materials with a 40 to 70% volume content of G1 and/or G2 graphite, and 5 to 25% volume content of conducting fibres, the transverse conductivity obtained varies between 1 and 30 S/cm while the longitudinal conductivity obtained varies between 50 and 200 S/cm.

This characteristic can result in a very low surface contact resistance for bipolar plates. The bipolar plate obtained directly by moulding according to the invention can provide electrical contact between the different adjacent components of a fuel cell without additional surface treatment. Furthermore, the high thermal conductivity in directions parallel to the surface of the plates helps to dissipate heat towards the outside of the cell. This property helps to optimise cooling of the electrochemical cell.

In a PEMFC or DMFC structure, another function of the current collecting plates is to separate hydrogen or oxygen gases (or air) circulating in the supply ducts formed on each surface of the plate, in the option of a bipolar plate. In the case of this invention, the plate is sealed to prevent passage of these two gases as a result of the chemical nature of the compounds (particularly graphite and thermoplastic binder) and the stratified structure of the material, without any additional treatment or insertion of a barrier material. Thus, the use of a G2 graphite makes it possible to achieve permeability to hydrogen 40 times lower than is possible with pyrolized machined phenolic graphite plates. The formulations based on G1 commercial graphite alone have permeabilities at least thirty times higher.

The advantages provided by this invention over prior art include porosity and mechanical properties. Kneading of the polymer and its compression in the molten state improve filling of the voids in the mix. This property can firstly improve permeability to gases and secondly reinforce mechanical properties by better cohesion between the fillers and the binder. The presence of conducting fibres on the formulations also optimises mechanical properties and the volume conductivity.

The organic binder is mixed with graphitic and fibrillary fillers in the molten state. The density of the paste obtained is greater than 1.5 g/cm$^3$ and the paste is free of binder dust and graphite dust. This conditioning facilitates transfer operations in the mould.

The mould may be used cold, which facilitates mould removal and avoids the need for heating and cooling operations of the mould. The moulding time is very short, from 1 to 10 minutes.

Compared with conventional extrusion or injection processes, the process according to the invention has the advantages that compression moulding is possible (in other words either by moulding/compression, or by extrusion/transfer or by extrusion/compression, or by injection/compression) to formulate materials with a content of conducting material (graphite and fibres) exceeding 50% by volume, and particularly close to 85% by volume. Such mixes could not be transformed by injection because their viscosity is too high.

The process according to the invention does not generate any stress in the mix during the transfer into the mould. In the case of a conventional injection, the resin spreads firstly onto the surfaces of the mould at the beginning of injection by a partial spinning effect of the fillers due to the high mechanical stresses necessary to transfer the very viscous mix into the mould. This thin layer of resin induces a contact resistance at the surface of the injected plates. The "kneading-compression" technique (by extrusion/transfer, extrusion/compression or injection/compression) adapted to formulations with high content of fillers, prevents the formation of an insulating film on the surface of the plates and enables their use in the condition as removed from the mould.

The invention claimed is:

1. Conducting composite material composed of a kneaded and compressed mix, the mix comprising a flake graphite powder, conducting fibres and an organic binder, the mix comprising:
   from 40 to 90% by volume of a flake graphite powder comprising a first flake graphite type formed from lamellas with a size grading of between 10 and 100 μm, and a second flake graphite type formed by agglomerating graphite particles such that the graphite particles are bonded to each other and superposed such that their principal planes are parallel to each other, these agglomerates having a planar anisotropy with side dimensions between 10 μm and 1 mm and between 5 and 50 μm thick,
   from 0 to 25% by volume of conducting fibres, and
   from 10 to 40% by volume of an organic binder.

2. Conducting composite material according to claim 1, in which the second flake graphite type agglomerates are composed of particles with side dimensions between 5 and 20 μm and between 0.1 and 5 μm thick.

3. Conducting composite material according to claim 1, in which the first type of flake graphite is composed of lamellas with a size grading of between 20 μm and 50 μm.

4. Conducting composite material according to claim 1, in which the conducting fibres are chosen from among carbon fibres, stainless steel fibres arid nickel plated carbon fibres.

5. Conducting composite material according to claim 1, in which the conducting fibres are between 1 and 4 mm long.

6. Conducting composite material according to claim 1, in which the organic binder is a thermoplastic material.

7. Conducting composite material according to claim 6, in which the organic binder is a fluorinated type thermoplastic material.

8. Conducting composite material according to claim 7, in which the organic binder is PVDF.

9. Conducting composite material according to claim 8, in which the mix comprises 70 to 85% by volume of graphite powder, from 0 to 10% of conducting fibres and from 10 to 25% of PVDF.

10. Manufacturing process for a conducting composite material, comprising:
    agglomerating graphite particles such that the graphite particles are bonded to each other and superposed such that their principal planes are parallel to each other, resulting agglomerates having a planar anisotropy and with side dimensions between 10 μm and 1 mm and between 5 and 50 μm thick, obtaining a mix comprising 10 to 40% by volume of an organic binder in the form of a powder or pellets, from 40 to 90% by volume of a flake graphite powder comprising a first flake graphite type formed from lamellas with a size grading of between 10 and 100 μm, and a second type of flake graphite composed of the agglomerates of the graphite particles obtained from said agglomerating, and up to 25% by volume of conducting fibres with a length of between 0.5 and 10 mm, kneading or extrusion of the mix obtained at a temperature greater than the melting temperature of the organic binder so that a paste can be obtained from said mix, transferring the paste into a mould at a temperature lower than the melting temperature of the organic binder, and compression of the paste contained in the mould to obtain said conducting composite material.

11. Process according to claim 10, in which the paste contained in the mould is compressed by a method chosen from among uniaxial compression, extrusion/transfer, extrusion/compression, injection and iniection/compression.

12. Process according to claim 10, in which the second flake graphite type is obtained by grinding graphite sheets in the solid phase or solvent phase followed by sieving, a said graphite sheet being composed of graphite particles, the principal planes of which are parallel to the plane of said sheet.

13. Process according to claim 12, in which grinding of the graphite sheets consists of grinding sheets of graphite made by calendering and/or rolling of natural or expanded graphite.

14. Process according to claim 10, in which the second flake graphite type is obtained by grinding a mass of graphite obtained by compression in the solid or liquid phase, followed by sieving.

15. Process according to claim 10, in which the second flake graphite type is obtained using the following steps:

dispersion of exfoliated graphite platelets or platelets obtained by grinding a graphite sheet in an organic solvern until a homogenous paste is obtained, drying of the homogenous paste obtained, crushing of the dried paste to obtain agglomerates of the graphite particles, sieving of the graphite particle agglomerates.

16. Process according to claim 15, in which the drying step is done by filtration of the solvent followed by degassing in a vacuum chamber.

17. Process according to claim 10, in which kneading is done in an extruder.

18. Process according to claim 10, in which kneading is done in a Bambury type kneader with internal mixing.

19. Process according to claim 10, in which the mix is kneaded or extruded at a temperature between the melting temperature of the organic binder and a temperature 100° C. above said melting temperature.

20. Process according to claim 10, in which the paste is transferred into a mould at a temperature of between 20° C. and 70° C.

21. Process according to claim 10, in which the paste is compressed at a pressure of 0.5 to 5 tonnes/cm$^2$.

22. Process according to claim 10, in which the compression duration is between 1 minute and 10 minutes.

23. Electrode for a ifiel cell, comprising means or circulating a gas fluid at the surface of at least one of its main faces, in which it is made oh conducting composite material composed of a kneaded and compressed mix, the mix comprising:

from 40 to 90% by volume of a flake graphite powder comprising a first type of flake graphite formed from lamellas with a size grading of between 10 and 100 μm and a second type of flake graphite formed from agglomerates of graphite particles bonded to each other and superposed such that their principal planes are parallel to each other, these agglomerates having a planar anisotropy with side dimensions between 10 μm and 1 mm and between 5 and 50 μm thick, from 0 to 25% by volume of conducting fibres, and from 10 to 40% by volume of an organic binder, the lamnellas and the agglomerates having their principal planes parallel to each other and parallel to the main faces of the electrodes.

24. Electrode for fuel cell according to claim 23, in which the first type of flake graphite is composed of lainellas with a size grading of between 20 and 50 μm.

25. Electrode for a fuel cell according to claim 23, in which the agglomerates of the second type of flake graphite are composed of particles with side dimensions of between 5 to 20 μm and between 0.1 and 5 μm thick.

26. Electrode for a fuel cell according to claim 23, in which the conducting fibres are chosen from carbon fibres, stainless steel fibres and nickel plated carbon fibres.

27. Electrode for a fuel cell according to claim 23, in which the length of the conducting fibres is between 1 and 4 mm.

28. Electrode for a fuel cell according to claim 23, in which the organic binder is a thermoplastic material.

29. Electrode for a fuel cell according to claim 28, in which the organic binder is a fluorinated type of thermoplastic material.

30. Electrode for a fuel cell according to claim 29, in which the organic binder is PVDF.

31. Electrode for a fuel cell according to claim 30, in which the mix comprises front 70 to 85% by volume of graphite powder, front 0 to 10% by volume of conducting fibres and front 10 to 25% by volume of PVDF.

32. Manufacturing process of an electrode for a fuel cell comprising means of circulating a gas fluid at the surface of at least one of its main faces, comprising:

obtaining a mix comprising 10 to 40% by volume of an organic binder in the form of a powder or pellets, front 40 to 90% by volume of a first type of flake graphite formed from lamellas with a size grading of between 10 and 100 μm and a second type of flake graphite powder composed of agglomerates of graphite particles bonded to each other and superposed such that their principal planes are parallel to each other, these agglomerates having a planar anisotropy and with side dimensions between 10 μm and 1 mm and between 5 and 50 μm thick, and up to 25% by volume of conducting fibres with a length of between 0.5 and 10 mm, kneading or extrusion of the mix obtained at a temperature greater than the melting temperature of the organic binder so that a paste can be obtained from said mix, transferring the paste into a mould designed to reproduce said means to enable circulation of a gas fluid, the temperature of the mould being below the melting temperature of the organic binder; and compression of the paste contained in the mould to obtain said electrode.

33. Process for manufacturing an electrode for a fuel cell according to claim 32, in which the paste contained in the mould is compressed by a method chosen from among uniaxial compression, extrusion/transfer, extrusion compression, injection and injection/compression.

34. Process for manufacturing an electrode for a fuel cell according to claim 32, in which the second type of flake graphite is obtained by grinding graphite sheets in the solid phase or solvent phase followed by sieving, a said graphite sheet being composed of graphite particles for which the principal planes are parallel to the plane of said sheet.

35. Process for manufacturing an electrode for a fuel cell according to claim 34, in which grinding of the graphite sheets consists of grinding the sheets of graphite obtained by calendering and/or rolling of natural or expanded graphite.

36. Process for manufacturing an electrode for a fuel cell according to claim 32, in which the second type of flake graphite is obtained by grinding a mass of graphite obtained by compression, in the solid or liquid phase, grinding being followed by sieving.

37. Process for manufacturing an electrode for a fuel cell according to claim 32, in which the second type of flake graphite is obtained using the following steps:
- dispersion of exfoliated graphite platelets or platelets obtained by grinding a graphite sheet in an organic solvent until a homogenous paste is obtained,
- drying of the homogenous paste obtained,
- crushing of the dried paste to obtain agglomerates of the graphite particles,
- sieving of the graphite particle agglomerates.

38. Process for manufacturing an electrode for a fuel cell according to claim 37, in which the drying step is done by filtration of the solvent followed by degassing in a vacuum chamber.

39. Process according to claim 32, in which kneading is done in an extruder.

40. Process according to claim 32, in which kneading is done in a Bambury type kneader with internal mixing.

41. Process according to claim 32, in which the mix is kneaded or extruded at a temperature between the melting temperature of the organic binder and a temperature 100° C. above said melting temperature.

42. Process according to claim 32, in which the paste is transferred into a mould at a temperature of between 20° C. and 70° C.

43. Process according to claim 32, in which the paste is compressed at a pressure of between 0.5 to 5 tonnes/cm$^2$.

44. Process according to claim 32, in which the duration of the compression is between 1 minute and 10 minutes.

* * * * *